(12) United States Patent (10) Patent No.: US 8,259,804 B2
Lu (45) Date of Patent: Sep. 4, 2012

(54) METHOD AND SYSTEM FOR SIGNAL PREDICTION IN PREDICTIVE CODING

(75) Inventor: Ligang Lu, New City, NY (US)

(73) Assignee: International Business Machines Corporation, Armonk, NY (US)

( * ) Notice: Subject to any disclaimer, the term of this patent is extended or adjusted under 35 U.S.C. 154(b) by 1646 days.

(21) Appl. No.: 11/619,560

(22) Filed: Jan. 3, 2007

(65) Prior Publication Data

US 2008/0159390 A1 Jul. 3, 2008

(51) Int. Cl.
*H04N 7/36* (2006.01)
(52) U.S. Cl. ......... 375/240.14; 375/240.16; 375/240.27; 375/240.29
(58) Field of Classification Search ............. 375/240.14, 375/240.16, 240.27, 240.29
See application file for complete search history.

(56) References Cited

U.S. PATENT DOCUMENTS

| | | | | |
|---|---|---|---|---|
| 5,001,560 | A * | 3/1991 | Ericsson | 375/240.14 |
| 5,377,051 | A * | 12/1994 | Lane et al. | 386/314 |
| 6,115,071 | A | 9/2000 | Hurst, Jr. et al. | |
| 6,285,710 | B1 | 9/2001 | Hurst, Jr. et al. | |
| 6,856,699 | B1 | 2/2005 | Olivieri | |
| 2003/0152146 | A1 | 8/2003 | Lin et al. | |
| 2005/0248687 | A1* | 11/2005 | Lee et al. | 348/606 |

FOREIGN PATENT DOCUMENTS

| | | |
|---|---|---|
| EP | 0 779 742 A2 | 6/1997 |
| WO | WO 00/42772 | 7/2000 |

OTHER PUBLICATIONS

International Search Report dated Jun. 20, 2008.
Albert Van Der Werf et al., A Single-Chip MPEG-2 Video Encoder for Storage, IEEE Journal of Solid-State Circuits, IEEE Service Center, Piscataway, NJ, US vol. 32, No. 11, Nov. 1, 1997.
Hye-Yoen Cheong, et al., "Adaptive Spatio-temporal Filtering for Video De-noising", Image Processing, 2004, ICIP '04. 2004 International Conference on Singapore Oct. 24-27, 2004, Piscataway, NJ, USA, IEEE, vol. 2, pp. 965-968.
Altunbasak Y. et al., "Low-Complexity Rate-Distortion Optimal Macroblock Mode Selection and Motion Estimation for MPEG-Like Video Coders", IEEE Transactions on Circuits and Systems for Video Technology, IEEE Service Center, Piscataway, NJ, US, vol. 15, No. 7, Jul. 1, 2005, pp. 823-834.

* cited by examiner

*Primary Examiner* — Sath V Perungavoor
*Assistant Examiner* — Jeffery Williams
(74) *Attorney, Agent, or Firm* — Daniel P. Morris; McGinn IP Law Group, PLLC

(57) ABSTRACT

A method (and system) for coding a signal includes comparing a first prediction which is based upon a previously reconstructed signal to an actual signal to determine a first prediction error, comparing a second prediction which is based upon temporal filtering to the actual signal to determine a second prediction error, and selecting one of the first prediction error and the second prediction error.

20 Claims, 9 Drawing Sheets

Figure 8
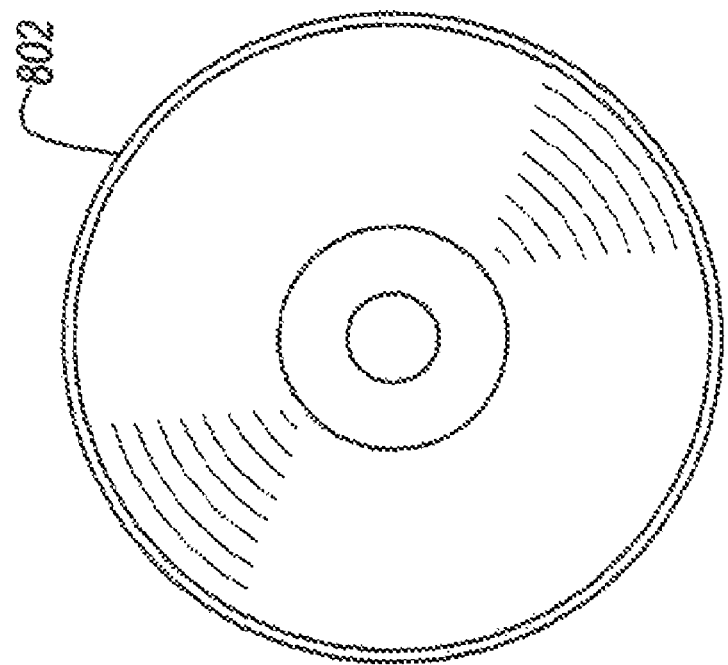
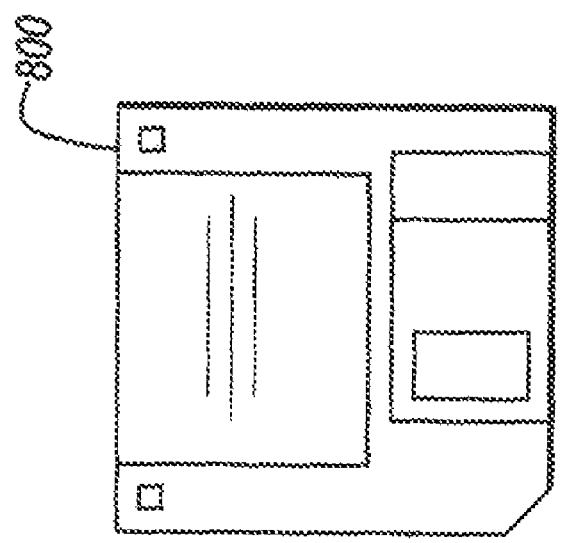

METHOD AND SYSTEM FOR SIGNAL PREDICTION IN PREDICTIVE CODING

BACKGROUND OF THE INVENTION

1. Field of the Invention

The present invention relates generally to methods and systems for data compression. More specifically, the present invention describes methods and systems for signal prediction in predictive coding.

2. Description of the Related Art

In predictive coding, instead of coding the source symbol directly, the encoder first generates a predictor of the signal symbol to be coded and computes the prediction error, i.e., the difference between the source symbol and its predictor, then encodes only the prediction error and sends the codeword to the decoder. The decoder decodes the received codeword to obtain the prediction error and performs the same prediction operation at the encoder to generate the same predictor. The decoder then reconstructs the symbol by adding the decoded prediction error to the predictor. To predict the current symbol, the encoder uses the previously decoded symbols to generate a predictor.

Predictive coding is widely used in many applications, especially those involving video, audio, and other media signals. FIG. 1 illustrates a conventional predictive encoder 100, with a comparator 102, an encoder 104, a decoder 108, and a storage device 106. When the source to be encoded is video, it generally contains motion. Predictive coding is usually used in conjunction with motion estimation and transform coding to provide an efficient video coding technique, that is called "motion-compensated predictive coding." Examples of such techniques include those developed by the Motion Picture Experts Group (MPEG) of the International Organization for Standards (ISO), the H.26x techniques developed by the International Telecommunications Union (ITU), and the like.

In motion-compensated predictive coding of a video frame, an encoder first performs motion estimation. The motion estimation searches one or more reference frames to find the best match between the block of the source signals, in this case, a block of pixels to be coded in the current frame and a block of pixels in the reference frame. The reference frames are usually the previously reconstructed frames so that the same references are also available at the decoder. The best matching block has the minimum differential error compared to the block to be coded in terms of a pre-selected error measure, for example the mean squared error (MSE) or the sum of absolute difference (SAD). This minimum error, or "residue," is called "the motion-compensated prediction error."

Also, the differences between the coordinates of the block to be coded in the current frame and its best matching block in the reference frame form a coordinate displacement vector called a motion vector $mv=(mv_x, my_y)$, where $mv_x$, $my_y$ indicate the block's horizontal displacement and vertical displacement, respectively. As mentioned above, the motion-compensated prediction error is usually compressed using transform coding. The motion-compensated prediction error is transformed into a frequency domain representation, e.g., Discrete Cosine Transform (DCT) for better compression performance. Quantization and entropy coding are then performed on the frequency coefficients, and the motion vector is also coded and transmitted to the decoder. In decoding, the decoder first decodes the received signal to recover the prediction error and motion vectors by performing entropy decoding, inverse quantization, inverse DCT, etc., then uses the motion vector to find the corresponding predictor (the best match) from the reference frame(s) and adds it to the decoded prediction error.

FIG. 2 illustrates a conventional predictive video encoding system 200. The system 200 includes a comparator 202, an encoder 204, a motion estimator 206, a motion-compensated predictor 208, a frame storage 210, and a decoder 212.

The motion estimator 206 receives a current frame Pn and at least one previously reconstructed frame as the reference frame and determines a motion vector, $mv=(mvx, mvy)$, which indicates the differences in horizontal and vertical coordinates of a pixel block in a reference image and a corresponding pixel block in the image being encoded.

The motion-compensated predictor 208 receives the motion vector, mv, from the motion estimator 206, and also receives one or more reference frames from the frame storage 210 to provide a motion-compensated prediction for the pixel values. The motion-compensated prediction from the motion-compensated predictor 208 is compared to the current pixel value by a comparator 202 to provide a motion-compensated prediction error signal En.

An encoder 204, then encodes the prediction error En and the motion vector mv to provide the output signal.

A decoder 212 emulates the decoding process at the receiver so that both encoder and decoder have exactly the same reconstructed frames as the reference frames. It decodes the coded signal from the encoder 204 and provides the decoded output signal to frame storage 210, which will be used by the motion estimator 206 and the motion-compensated predictor 208 to provide a reference for the next frame.

In general, the performance of predictive coding largely depends on the prediction scheme. For example, for video coding, the performance depends largely on the motion-compensated prediction scheme to produce the minimum prediction errors.

The conventional methods and systems for predictive coding only work well when there is strong statistical correlation in the source symbols. If the correlation is weak, then the prediction will not be able to effectively predict the next source symbol to be encoded and result in large prediction errors and poor performance.

Furthermore, there is usually noise existing in the source and the transmission channel. The compression itself will also cause quantization noise. When there is noise in the reference signal that is used as the predictor or when the next signal symbol to be encoded itself is contaminated with noise, the conventional methods and systems of predictive coding do not have the ability to correct or reduce the errors caused by noises and oftentimes fail to effectively predict the signal symbol to be encoded. This results in large prediction error and, therefore, poor coding performance. In this manner, these issues adversely affect the ability of conventional predictive coders to compress a signal.

SUMMARY OF THE INVENTION

In view of the foregoing and other exemplary problems, drawbacks, and disadvantages of the conventional methods and systems, an exemplary feature of the present invention is to provide a method and structure in which a video coder is provided with an alternative to a motion-compensated pixel prediction.

In a first exemplary aspect of the present invention, a method for coding a signal includes comparing a first prediction which is based upon a previously reconstructed signal to an actual signal to determine a first prediction error, comparing a second prediction which is based upon temporal filtering to the actual signal to determine a second prediction error, and selecting one of the first prediction error and the second prediction error.

In a second exemplary aspect of the present invention, a system for coding a signal includes a first comparator for comparing a first prediction error signal for a current signal and a previously reconstructed signal to an actual signal to determine a first prediction error, a second comparator for comparing a second prediction error signal for the current signal which is based upon temporal filtering to said actual signal to determine a second prediction error, and a selector that selects one of the first prediction error and the second prediction error.

In a third exemplary aspect of the present invention, a program embodied in a computer readable medium executable by a digital processing unit includes instructions for comparing a first prediction which is based upon a previously reconstructed signal to an actual signal to determine a first prediction error, instructions for comparing a second prediction which is based upon temporal filtering to the actual signal to determine a second prediction error, and instructions for selecting one of the first prediction error and the second prediction error.

An exemplary embodiment of the present invention provides a video coding method and system that provides a selection between a motion-compensated temporally filtered signal and a motion-compensated prediction signal. In this manner, the present invention reduces the amount of data being transmitted.

An exemplary embodiment of the present invention provides a video coding method and system that selects between a motion-compensated temporally filtered signal and a motion-compensated prediction signal. In this manner, the present invention reduces the amount of information being transmitted.

An exemplary embodiment of the present invention provides a video coding method and system that selects between a spatially extrapolated/interpolated signal and a motion-compensated prediction signal. In this manner, the present invention reduces the amount of data being coded.

An exemplary embodiment of the present invention provides a video coding method and system that selects between an extrapolated/interpolated signal and a motion-compensated prediction signal which provides the smallest error to code. The motion-compensated filtering or extrapolation/interpolation is not based upon the current pixel value. In this manner, the present invention reduces the amount of data being transmitted.

Further, the motion-compensated temporal filter or extrapolation/interpolation system does not use the current frame. Rather, it only uses reference frames which are the previously reconstructed frames. Therefore, the decoder can perform the same filtering or extrapolation/interpolation process as the encoder. So, if the encoder selects the alternative prediction error generated by the motion-compensated temporal filtering, then there is no need to transmit the motion vectors to the decoder side. Rather, only a one-bit flag per block is transmitted to signal the selection. In this manner, the number of bits that are needed in transmitting the signal can be reduced.

Other aspects, features and advantages of the invention will be more fully apparent from the ensuing disclosure and appended claims.

These and many other advantages may be achieved with the present invention.

BRIEF DESCRIPTION OF THE DRAWINGS

The foregoing and other exemplary purposes, aspects and advantages will be better understood from the following detailed description of an exemplary embodiment of the invention with reference to the drawings, in which:

FIG. 8 illustrates signal bearing media 800 and 802 (e.g., storage media for embodying a program that is executable by a digital processing unit according to the present invention.

DETAILED DESCRIPTION OF EXEMPLARY EMBODIMENTS OF THE INVENTION

Figure 1:
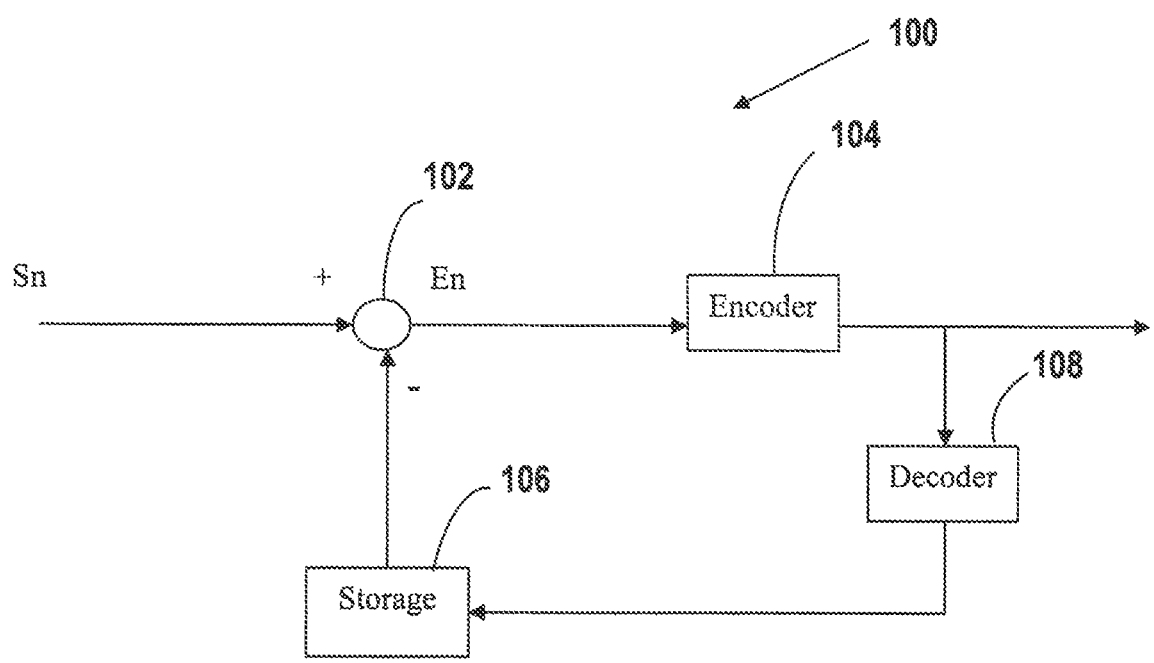
FIG. 1 is a diagram illustrating one conventional video predictive encoding system 100.

Referring now to the drawings, and more particularly to FIGS. 3-8, there are shown exemplary embodiments of the method and structures of the present invention.

Figure 3:
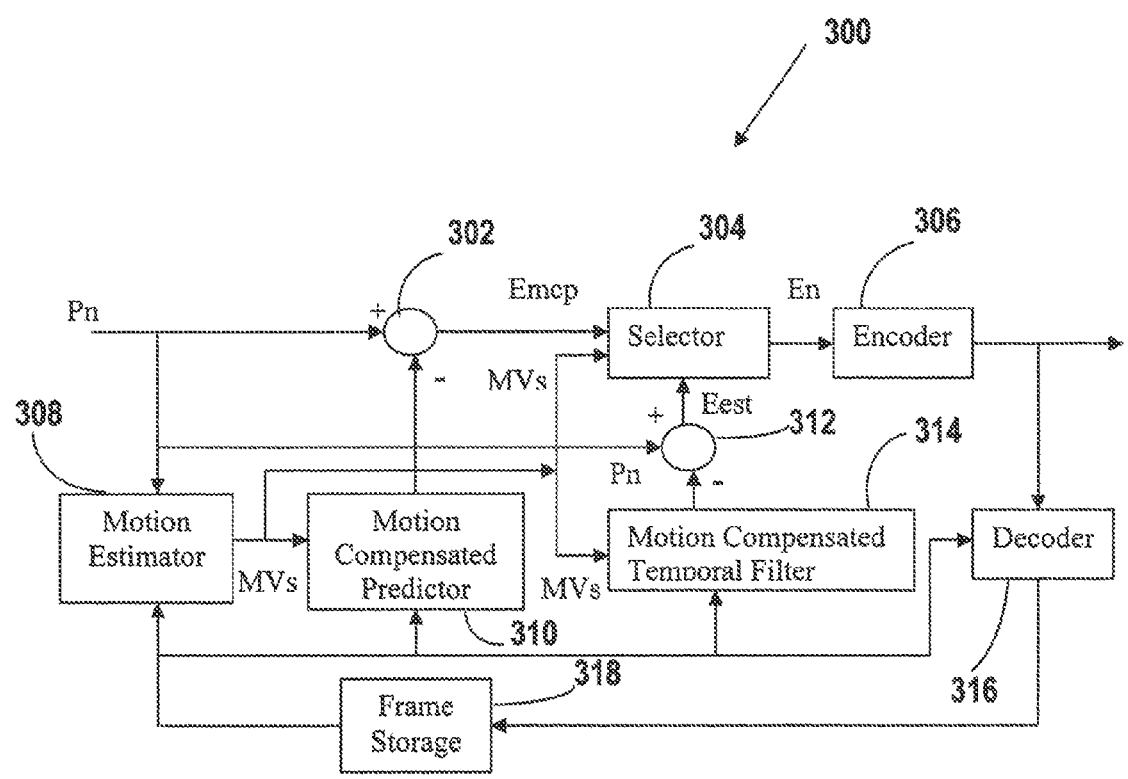
FIG. 3 is a diagram illustrating an exemplary predictive video coding system 300 according to the present invention.

FIG. 3 illustrates an exemplary system 300 for video coding in accordance with the present invention. The system includes a first comparator 302, a selector 304, an encoder 306, a motion estimator 308, a motion-compensated predictor 310, a second comparator 312, a motion-compensated temporal filter 314, a decoder 316, and a frame storage 318.

Figure 2:
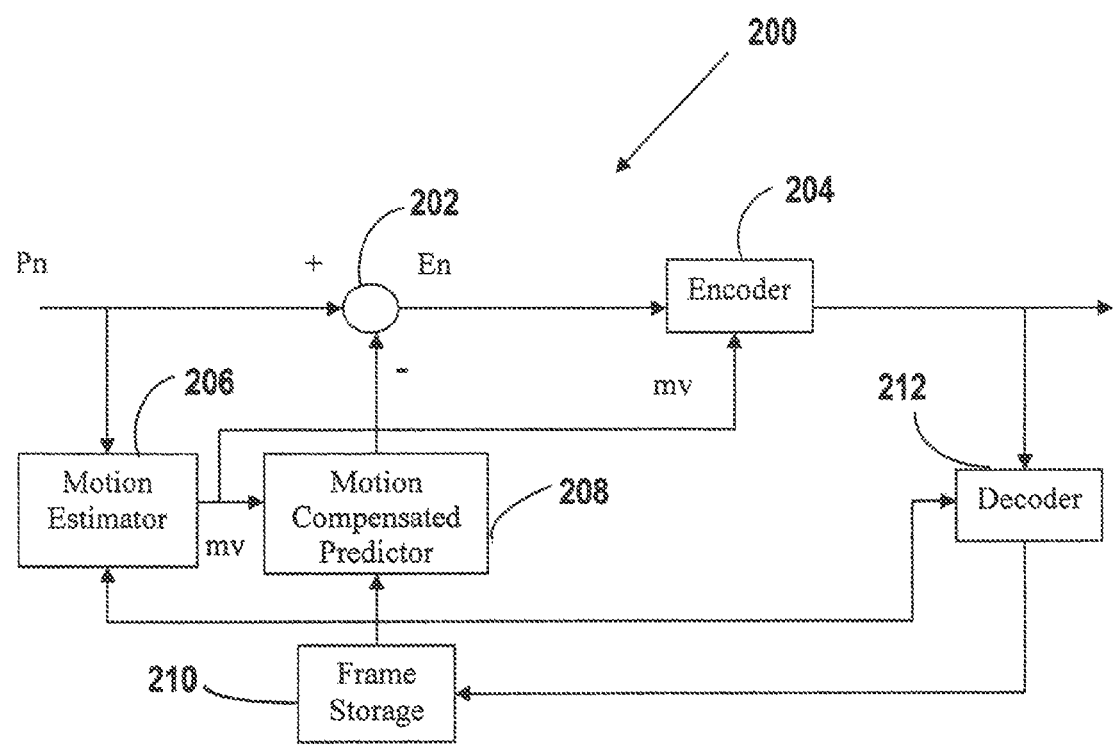
FIG. 2 is a diagram illustrating a conventional motion-compensated predictive coding system 200.

In comparison with the system 200 of FIG. 2, the system 300 of FIG. 3 includes the additional elements of the selector 304, the second comparator 312 and the motion-compensated temporal filter 314. The elements of system 300, which correspond to the elements of system 200, operate in the same manner as described above and a description of their operation is not repeated.

The motion-compensated temporal filter 314 receives the reference frame data from frame storage 318 (and, preferably, only the reference frame data). The motion estimator 308 performs motion estimation on the reference frames received from the frame storage 318 to find the corresponding best matches of pixels between these reference frames. Then, the motion-compensated temporal filter 314 performs motion-compensated temporal filtering to provide an estimate of the current pixel value in the current frame. This estimate is called the "motion-compensated temporal filtering prediction" and provides an alternative prediction of the current block in the current frame.

This alternative prediction from the motion-compensated temporal filter 314 is subtracted from the current pixel value by the comparator 312 to provide another prediction error Eest. The selector 304 selects one of the two prediction errors Emcp or Eest produced by the corresponding comparators 302 and 312. As described below, this alternative prediction error Eest provides the encoder several ways to operate for better performance.

Let the motion-compensated prediction error be $E_p$ and the temporal filtering predition error be $E_f$. Let $mv_p$ be the motion vector used to obtain $E_p$ and $mv_f$ the motion vector used to obtain $E_f$. Note that if the encoder encodes and transmits $E_p$, it will also need to encode and transmit $mv_p$ to the decoder because $mv_p$ is the motion vector between the current frame and the reference frame, and the decoder does not have the current frame.

On the other hand, if the encoder encodes and transmits $E_f$, it will not need to transmit $mv_f$ since it is the motion vector between the reference frames and the decoder can perform the same motion estimation process on the same reference frames to obtain $mv_f$.

Let b(.) be the function of the bits to encode the signal and D(.) the distortion incurred by the encoding operation. The selector 304 chooses a prediction error to encode that minimizes the bits needed to encode and transmit the signal, according to the following:

$$E_n=\min\{b(E_f),b(E_p)+b(mv_p)\}. \quad (1)$$

Another exemplary method of selecting a prediction error to encode minimizes the distortion, according to the following:

$$E_n=\min\{D(E_f),D(E_p)\}. \quad (2)$$

Yet another exemplary method of selecting a prediction error to encode optimizes the performance in the rate-distortion sense as follows:

$$E_n=\min\{D(E_f)+\lambda b(E_f), D(E_p)+\lambda(b(E_p)+b(mv_p))\} \quad (3)$$

where $\lambda$ is the Langrange factor which can be estimated through rate-distortion analysis on the source.

In this manner, the encoder may choose one of the methods of encoding the prediction error based upon whether the object is to minimize the number of encoding bits, to minimize the encoding distortion, or to minimize the operational rate-distortion performance. Therefore, the present invention improves the efficiency of video coding.

An exemplary embodiment of a motion-compensated temporal filter is described in co-pending patent application Ser. No. 11/619,567, filed on Jan. 3, 2007, assigned to the present assignee and which is incorporated herein by reference in its entirety.

Figure 4:
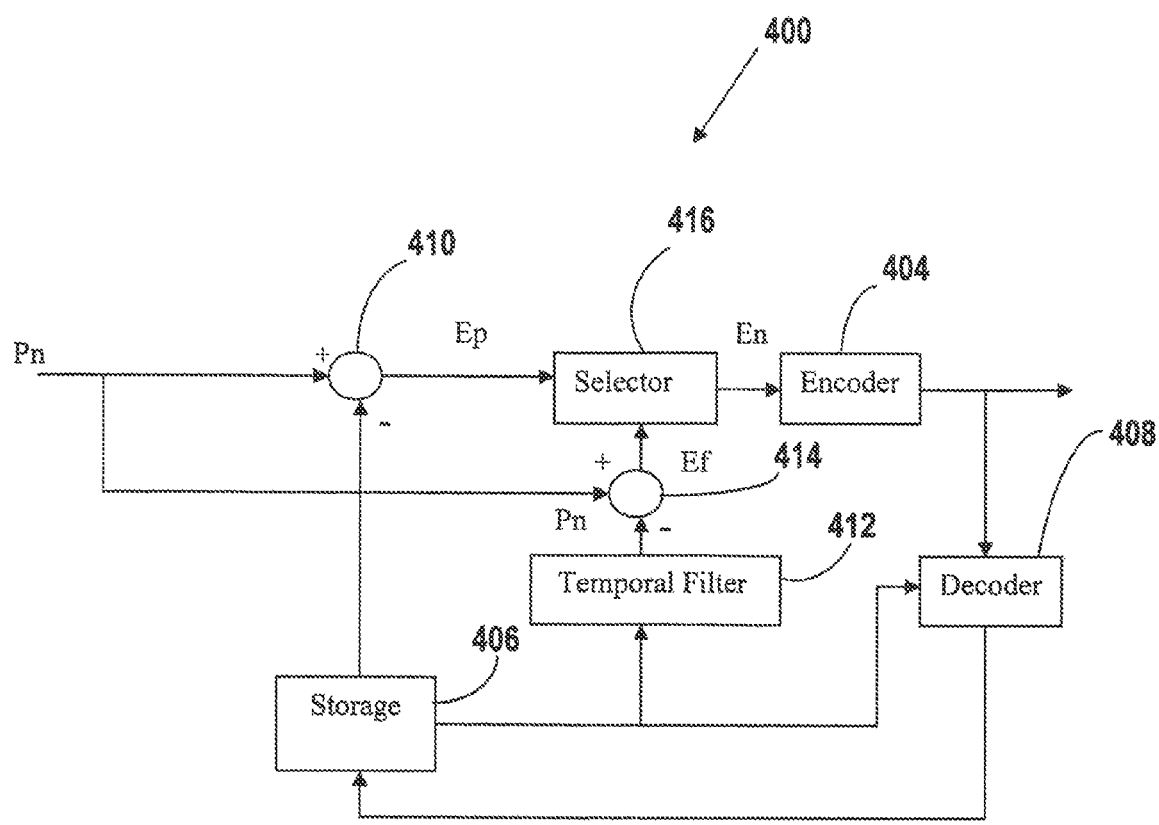
FIG. 4 is a diagram illustrating an exemplary predictive coding system 400 for non-video signal sources according to the present invention.

FIG. 4 illustrates an exemplary embodiment of a predictive coding system 400 for non-video signal sources according to the present invention. The system 400 of FIG. 4 differs from the system 100 of FIG. 1, because the system 400 includes a temporal filter 412 that generates a second predictor value as well as a second comparator 414.

The temporal filter 412 takes (and more preferably, only takes) the previously reconstructed signal symbols from the storage 406 and produces a second predictor value for the current signal symbol. Then, two predictor values are compared with the current signal symbol Pn to generate two prediction error signals Ep and Ef. The selector 416 chooses the smaller error signal to encode, and forwards the selected error signal En to the encoder 404. The encoded the error signal is sent to the decoder 408 along with a flag bit to inform the decoder 408 which predictor the encoder 404 has used in encoding the current signal symbol.

Figure 5:
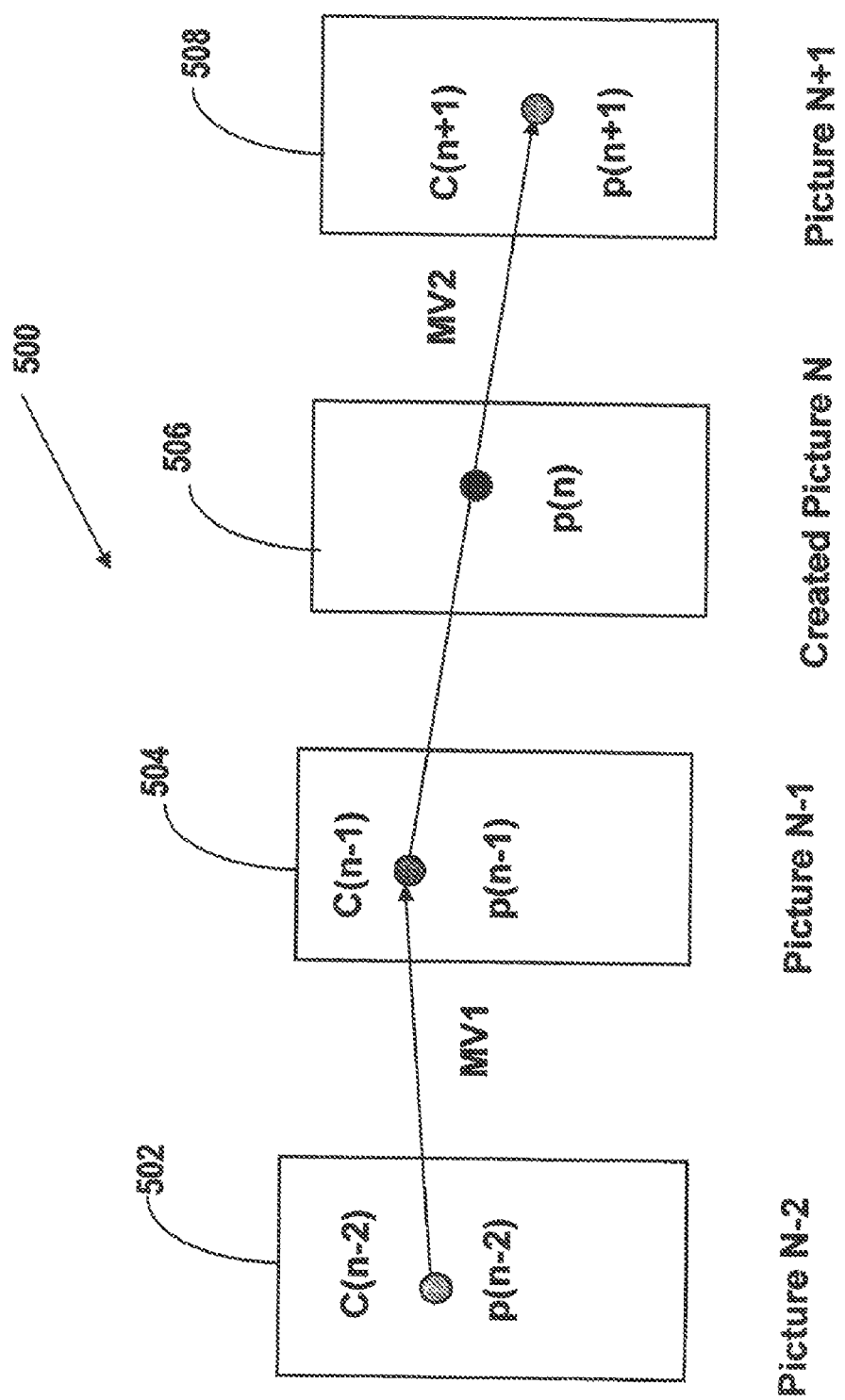
FIG. 5 is illustrates an application 500 of an exemplary method using motion-compensated temporal filtering according to an embodiment of the invention.

FIG. 5 illustrates the application of an exemplary motion-compensated temporal filter 314. This motion-compensated temporal filter 314 receives three reference frames, which include Picture N−2 502, Picture N−1, 504, and Picture N+1 508.

This motion estimator 308 performs motion estimation between Picture N−2 502 and Picture N−1 504 to provide a first motion vector MV1.

Next, the motion estimator 308 performs motion estimation between Picture N−1 504 and Picture N+1 508 to provide a second motion vector MV2.

Next, the motion-compensated temporal filter 314 predicts a new value for p(n) using a temporal filtering process which is described in detail below.

The new pixel value p(n) is obtained by a temporal filtering of the pixel values specified by the corresponding motion vectors from the reference frames according to the following equation:

$$p(n)=c(n-2)p(n-2)+c(n-1)p(n-1)+c(n+1)p(n+1) \quad (4)$$

where:
p(n−2) is the pixel value in Picture N−2 502;
p(n−1) is the pixel value in Picture N−1 504;
p(n+1) is the pixel value in Picture N+1 508;
c(n−2) is a filter coefficient for Picture N−2;
c(n−1) is a filter coefficient for Picture N−1; and
c(n+1) is a filter coefficient for Picture N+1.

Figure 6:
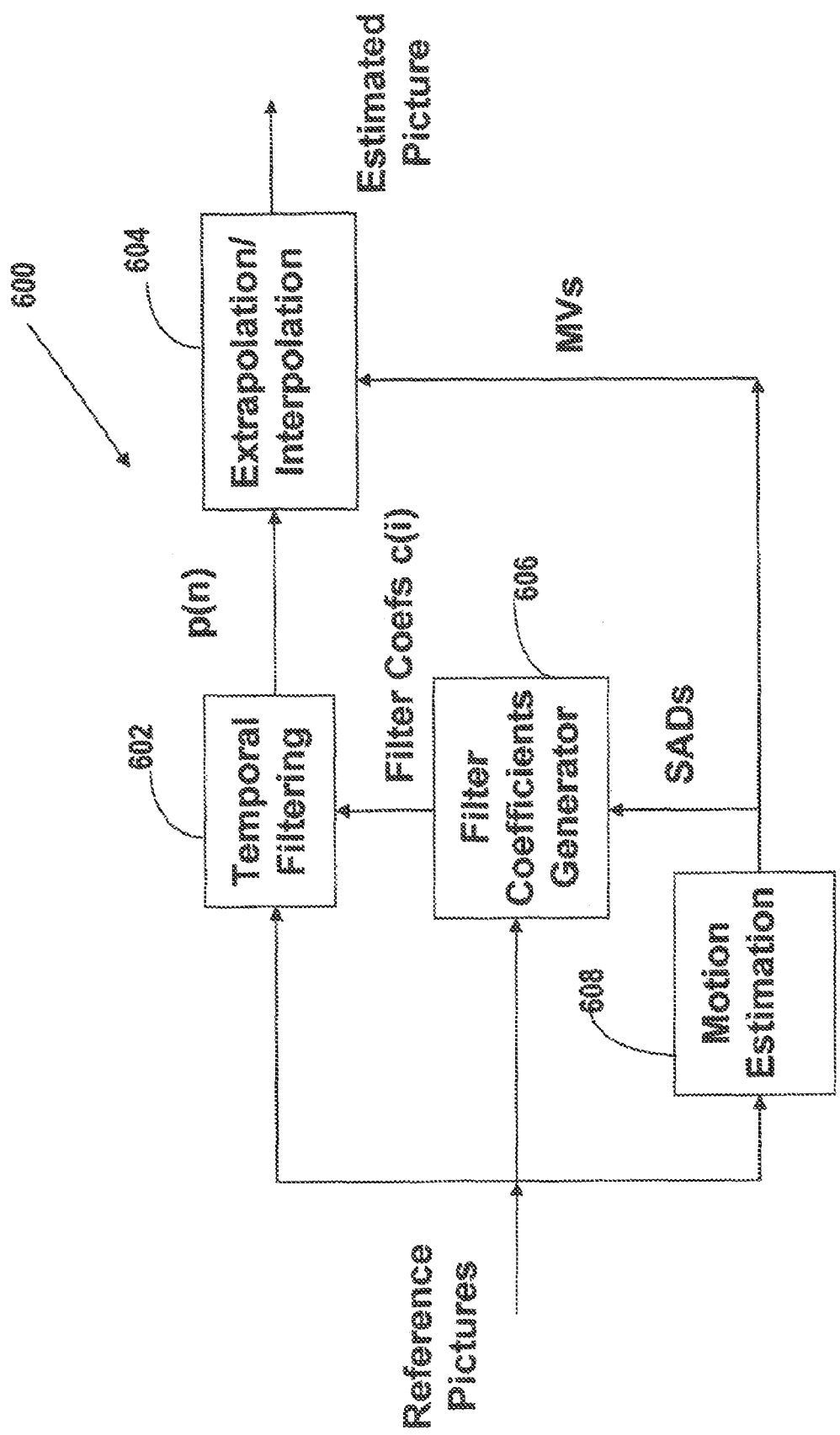
FIG. 6 illustrates a visual signal extrapolation or interpolation apparatus 600 using temporal filtering according to an embodiment of the invention.

FIG. 6 illustrates an exemplary embodiment of a system 600 for video coding in accordance with the present invention. The system 600 includes a motion estimation unit 608, a temporal filtering unit 602, a filter coefficient generator 606, and an extrapolation/interpolation unit 604.

The filter coefficient generator 606 generates the filter coefficients, such as c(n−2), c(n−1), and c(n+1) for the application illustrated in FIG. 5. These filter coefficients may be constants or may be adaptively adjusted. For example, the filter coefficients may be adjusted on a pixel-by-pixel basis or on a block-by-block basis depending upon the information from the reference pictures and the motion estimation results.

In the exemplary embodiment of FIG. 6, the filter coefficients generator 606 generates coefficients using SADs, which are based upon the motion estimation errors from the motion estimation unit 608. The SADs are the sum of the absolute differences which are obtained by taking the absolute value of the differences between each of the pixels of the two blocks being matched.

The extrapolation/interpolation unit 604 receives the value of the pixel p(n) as calculated by the temporal filtering unit 602 in accordance with Equation (4) and the motion vectors MVs from the motion estimation unit 608 and outputs the estimated picture.

One of ordinary skill in the art understands that the filter coefficients may be generated by any number of different methods and may even be constants and still practice the invention. The following is merely an example of one way of determining the filtering coefficients.

Figure 7:
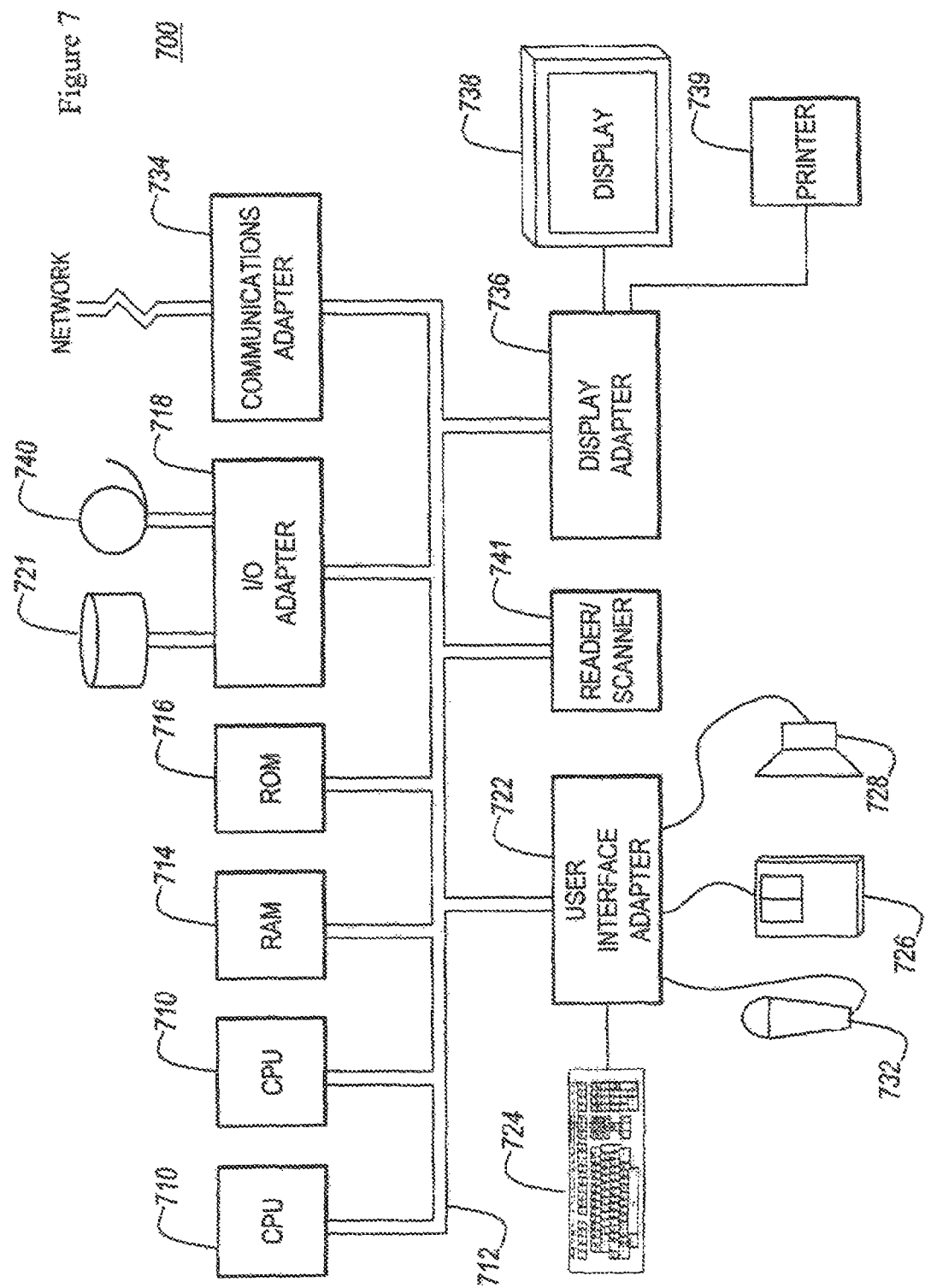
FIG. 7 illustrates an exemplary hardware platform 700 for incorporating the present invention therein.

Referring now to FIG. 7, system 700 illustrates a typical hardware configuration that may be used for implementing an exemplary embodiment of the present invention. The configuration may have preferably at least one processor or central processing unit (CPU) 710. The CPUs 702 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, and Intranet, a personal area network (PAN), etc., and a display adapter 736 for connecting the bus 712 to a display device 738 and/or printer 739. Further, an automated reader/scanner 741 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including a program embodied in a computer readable medium executable by a digital processor. Such a method may be implemented, for example, by operating the CPU 710 to execute a sequence of machine-readable instructions. These instructions may reside in various types of signal bearing media. Thus, this aspect of the present invention is directed to a program embodied in a computer readable medium executable by a digital processor incorporating the CPU 710 and hardware above, to perform a method in accordance with the present invention.

This signal-bearing media may include, for example, a RAM (not shown) contained within the CPU 710, as represented by the fast-access storage for example.

Alternatively, the instructions may be contained in another signal-bearing media, such as a magnetic data storage diskette 800, CD-ROM 802, or the like as illustrated by FIG. 8. These instructions may be directly or indirectly accessible by the CPU 710.

Whether contained in the computer server/CPU 710, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, complied from a language such as "C," etc.

Figure 9:
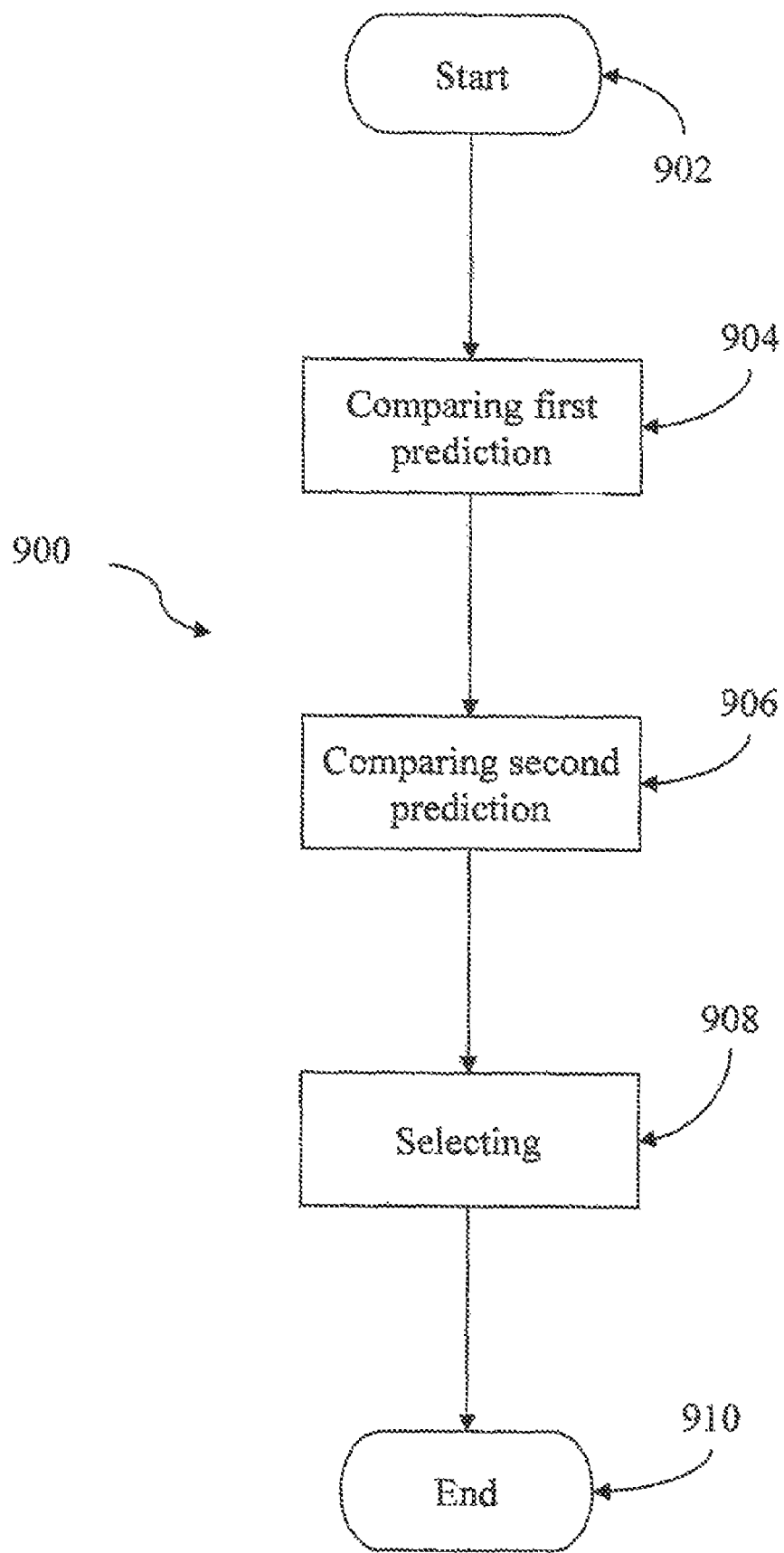
FIG. 9 is a flowchart 900 of an exemplary method in accordance with the present invention.

FIG. 9 is a flowchart 900 of an exemplary method in accordance with the present invention. The method starts at step 902 and continues to step 904, where the method compares a first prediction which is based upon a previously reconstructed signal to an actual signal to determine a first prediction error. The method continues to step 906 where the method compares a second prediction which is based upon temporal filtering to the actual signal to determine a second prediction error. The method then continues to step 908 where the method selects one of the first prediction error and the second prediction error. The method then ends at step 910.

While the invention has been described in terms of several exemplary embodiments, those skilled in the art will recognize that the invention can be practiced with modification.

The method and system described above is applicable to predictive coding of many kinds of data, including video and audio. While the above-detailed description only described the case of using an exemplary embodiment for video coding, those of ordinary skill in the art understand that the principles of the method and system can be readily extended to coding other kinds of data.

Further, it is noted that, Applicant's intent is to encompass equivalents of all claim elements, even if amended later during prosecution.

What is claimed is:

1. A method of encoding a signal, said method comprising:
receiving data for a current frame;
generating a first prediction for said current frame, as based on data for a previous Frame;
using a temporal filtering process on said previous frame data, using data from one or more previous frames, to generate a second prediction for said current frame, without using data from said current frame;
comparing, using a first comparator, said first prediction to said current frame data, to determine a first prediction error $E_p$;
comparing, using a second comparator, said second prediction to said current frame data, to determine a second prediction error $E_f$;
selecting one of said first prediction error and said second prediction error; and
encoding said selected first or second prediction error.

2. The method of claim 1,
wherein said generating said first prediction comprises conducting motion-compensated pixel prediction to provide a motion-compensated pixel prediction as said first prediction, and
wherein said generating said second prediction error comprises performing motion-compensated temporal filtering to provide an alternative pixel prediction as said second prediction.

3. The method of claim 1, where said selecting comprises selecting a smaller of said first prediction error and said second prediction error.

4. The method of claim 1, wherein said temporal filtering comprises performing one of an extrapolation and an interpolation.

5. The method of claim 1, further comprising:
generating a motion vector $mv_p$ indicating a block's horizontal and vertical displacement between the current frame data and the previous frame;
generating a motion vector $mv_f$ indicating a block's horizontal and vertical displacement between two previous frames;
using $mv_p$ to calculate the first prediction error; and
using $mv_f$ to calculate the second prediction error.

6. The method of claim 5, further comprising:
encoding and transmitting said motion vector $mv_p$ the first prediction error is selected; and
if the second prediction error is selected, transmitting a one-bit flag without encoding/transmitting the motion vector $mv_f$.

7. A system for coding a signal, said system comprising:
a first comparator for comparing a first prediction error signal for a current signal and a previously reconstructed signal to determine a first prediction error;
a second comparator for comparing a second prediction error signal for the current signal which is based upon temporal filtering, to determine a second prediction error without using said current signal;
a selector that selects one of said first prediction error and said second prediction error; and
encoding said selected first or second prediction error.

8. The system of claim 7, further comprising:
a first prediction generator that generates said first prediction error signal for the current signal and the previously reconstructed signal; and
a second prediction generator that generates the second prediction error signal for the current signal using temporal filtering, wherein said first prediction error generator comprises a motion estimator generating a first motion vector from a current pixel value and a reference pixel value and a motion-compensated predictor for predicting a motion-compensated pixel prediction based upon said first motion vector and said reference pixel value, and wherein said second prediction generator comprises an alternative pixel predictor for performing motion-compensated temporal filtering based upon a second motion vector not requiring said current pixel value.

9. The system of claim 8, further comprising an encoder that, if the first prediction error is selected, encodes the first motion vector and the first prediction error and, if said alternative pixel prediction error is selected, encodes the second prediction error and a one-bit flag and does not encode the second motion vector.

10. The system of claim 9, further comprising a decoder that decodes a reference pixel from the encoded motion vector and the encoded selected one of said motion-compensated pixel prediction error and said alternative pixel prediction error.

11. The system of claim 8, wherein said second prediction generator performs one of an extrapolation and an interpolation.

12. A non-transitory, computer readable storage medium tangibly embodying a set of machine-readable instructions executable by a digital processing unit, comprising:

instructions for comparing a first prediction which is based upon a previously reconstructed signal to an actual signal to determine a first prediction error;

instructions for comparing a second prediction which is based upon a temporal filtering to the actual signal to determine a second prediction error, such that the second prediction can be reconstructed by a decoder using only one or more previously reconstructed signals;

instructions for selecting one of said first prediction error and said second prediction error; and instructions for encoding said selected first or second prediction error.

13. A system for coding a signal comprising:

means for comparing a first prediction which is based upon a previously reconstructed signal to an actual signal to determine a first prediction error;

means for comparing a second prediction which is based upon temporal filtering to the actual signal to determine a second prediction error, such that the second prediction can be reconstructed by a decoder using only one or more previously reconstructed signals;

means for selecting one of said first prediction error and said second prediction error; and means for encoding said selected first or second prediction error.

14. The method of claim 5, wherein the selection between the first and second prediction errors is based upon a minimization of a number of bits b(.) needed to encode and transmit data for the current frame:

$$E_n = \min\{b(E_f), b(E_p) + b(mv_p)\}.$$

15. The method of claim 5, wherein the selection between the first and second prediction errors is based upon a minimization of a distortion D(.):

$$E_n = \min\{D(E_f), D(E_p)\}.$$

16. The method of claim 5, wherein the selection between the first and second prediction errors is based upon an optimization of a performance in a rate-distortion sense:

$$E_n = \min\{D(E_f) + \lambda b(E_f), D(E_p)_{30} \lambda b(E_p) + b(mv_p),$$

where $\lambda$ is a Lagrange factor estimated through a rate-distortion analysis on the input, D(.) is a distortion, and b(.) is a number of bits for encoding.

17. The method of claim 1, wherein said signal derives from a video source.

18. The method of claim 1, wherein said signal derives from a non-video source.

19. The method of claim 1, wherein said temporal filtering process comprises using three reference frames to generate a pixel value p(n) for a current frame.

20. The method of claim 19, wherein the pixel value p(n) is calculated as:

$$p(n) = c(n-2)p(n-2) + c(n-1)p(n-1) + c(n+1)p(n+1),$$

where:
p(n−2) is a pixel value in a frame (n−2),
p(n−1) is a pixel value in a frame (n−1),
p(n−1) is a pixel value in a frame (n+1),
c(n−2) is a filter coefficient for frame (n−2),
c(n−1) is a filter coefficient for frame (n−1), and
c(n+1) is a filter coefficient for frame (n+1).

* * * * *